July 3, 1923. 1,460,958
F. GAHLERT, JR
GEAR
Filed July 8, 1922 3 Sheets-Sheet 1
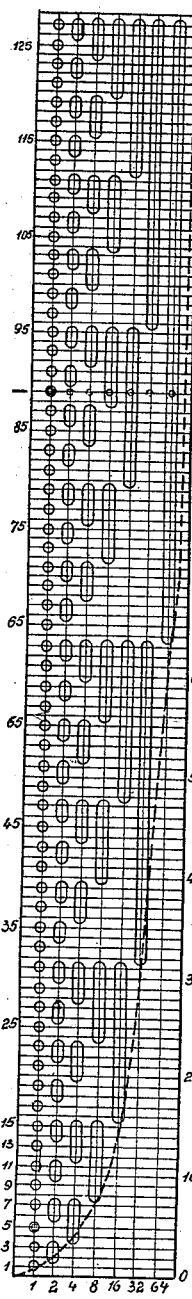
Fig. 4.
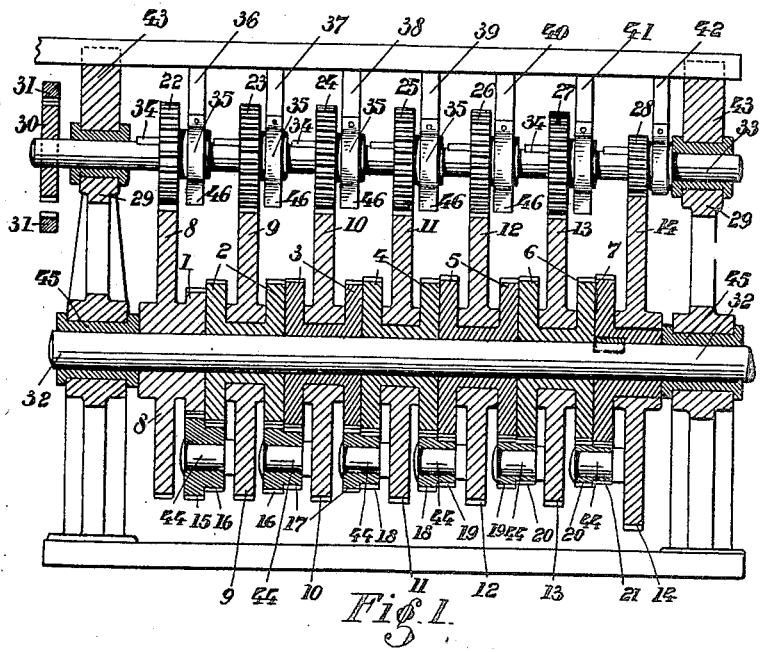
Fig. 1.
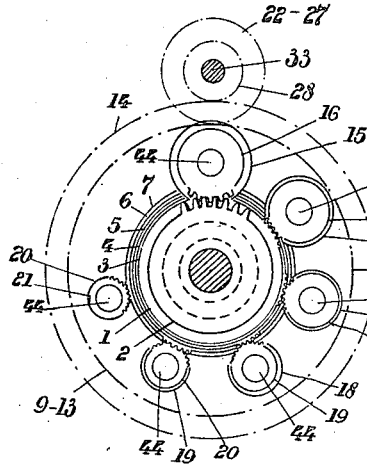
Fig. 2.
Fig. 3.
Inventor:
Franz Gahlert Jr.
by Stockbridge & Borst
Attys.

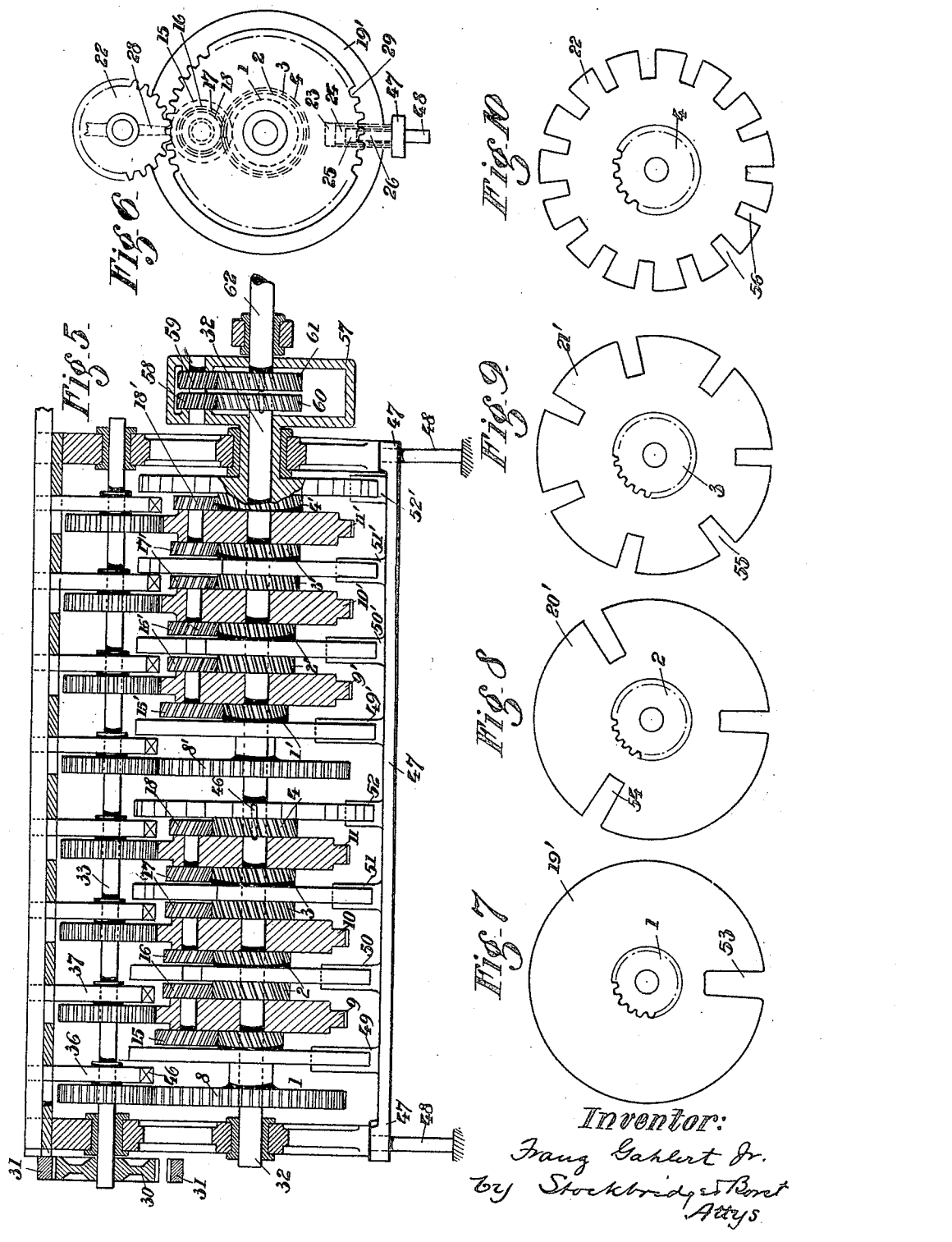

July 3, 1923.
F. GAHLERT, JR
1,460,958
GEAR
Filed July 8, 1922
3 Sheets-Sheet 3
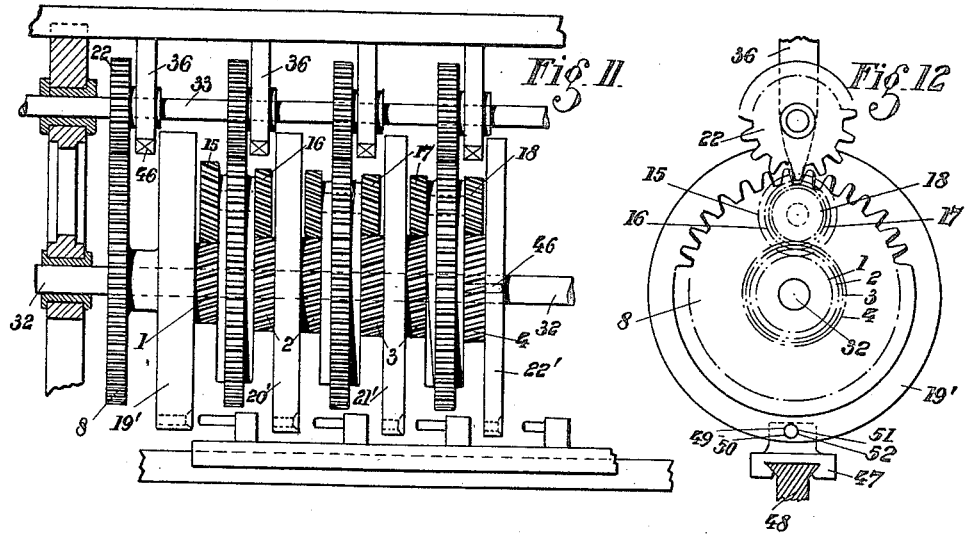
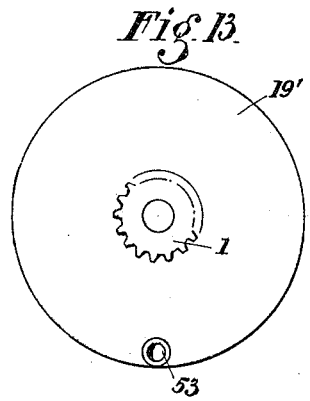
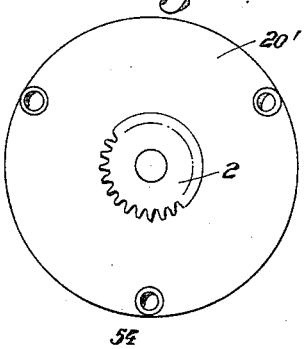
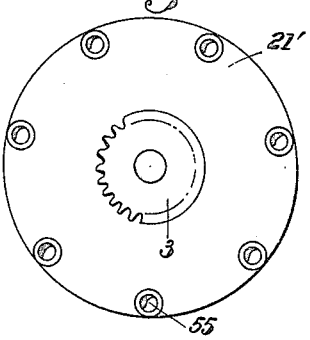
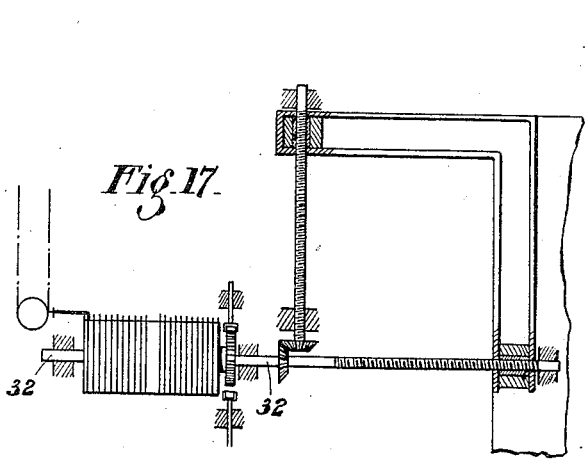
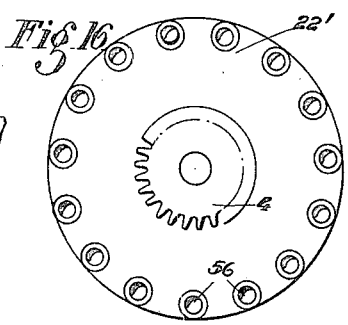
Inventor:
Franz Gahlert Jr.
by Stockbridge & Borst
Attys Patented July 3, 1923.

1,460,958

UNITED STATES PATENT OFFICE.

FRANZ GAHLERT, JR., OF WEIPERT, BOHEMIA.

GEAR.

Application filed July 8, 1922. Serial No. 573,679.

*To all whom it may concern:*

Be it known that I, FRANZ GAHLERT, Junior, residing at Weipert, Bohemia, have invented certain new and useful Improvements in Gears (for which I have filed applications in Germany Dec. 27, 1918; Germany Apr. 1, 1921; Germany Nov. 8, 1920; Germany April 7, 1922), of which the following is a specification.

This invention relates to gears, such as for example consist of a series of differential and planet wheel gears, each of which may add a certain amount of motion to the next so as to produce a resultant motion which is ultimately transferred from the last gear in the series to the driving member of a machine. Although the novel gear will permit of a more general application, it is particularly adapted for automatically imparting motions to the work frame or frames of embroidering machines. Motion transmitting devices of this kind are known, but it has been found in practice that these known devices have a large variety of drawbacks, one of these drawbacks consisting in the fact that a complicated change gear and intermediate gear is required to obtain a summation of the contributory motions of the individual intermediate gears which are mounted on the main shaft and revolve in opposite directions. This results in another serious disadvantage, namely a considerable amount of lost motion that arises between the differential and planet wheel gears.

One feature of the invention consists of means for arresting the motion of the differential gears in a step-by-step fashion and this contributes greatly towards the reduction of lost motion.

In accordance with another feature of the invention the individual differential gears are arranged in groups and placed one after the other on a shaft, the individual differential gears being coupled with each other by sun wheels of equal sizes and equal numbers of teeth, and the sun wheels increasing in size, or being stepped in proportion to the contributory motions, progressively through the entire gear.

Another feature of the invention consists in the toothed wheels which carry the planet wheels of the differential gears being arranged to cooperate with arresting members in the form of stopping wedges by which the gears can be arrested selectively so that the same differential gears may transfer the contributory motion in a different degree of the geometrical series in which the various steps representing the different contributory motions are contained. The various motions obtained, (each of which correspond to a geometrical series) thus only result by summation of the individual contributory motions. When the direction of the motion changes, all of the spur wheels and differential wheels travel in the opposite direction, and this results in the advantage that the work of altering the jacquard card in the case of wrong or bad stitches is considerably simplified in comparison with previous arrangements.

The novel means for arresting the differential gears are particularly sure in action, fluctuations and inaccuracies of the contributory motions produced by the play between the flanks of the teeth being prevented from occurring to the same extent as in previous devices. To this end a disk is associated with each sun wheel and a number of slots or recesses are provided in the periphery of the disks the number of recesses in each disk corresponding to the contributory motion imparted by the associated sun wheel. Setting members are provided which are adapted for engaging with these recesses after each operation of the gear, these setting members effecting an accurate positioning of the sun wheel. A rough or an approximate setting of the sun wheel is thus converted into a fine or accurate positioning of these wheels which corresponds to the exact amount of motion to be imparted to the work frame of the embroidering machine or the like. The effect of the play between the flanks of the teeth is thus eliminated. In order to be able to accomplish the accurate positioning of the gear in an easy and certain manner the setting members are brought into engagement one after the other commencing at the first differential gear, which carries out the greatest contributory motion.

The invention is illustrated in the drawing in which Figs. 1 to 4 show one constructional form, Fig. 1 representing a longitudinal section through a gear, Fig. 2 a diagrammatic showing of the pitch circles of the various wheels, Fig. 3 a side view of the grating formed by the longitudinally displaceable driving-wheel controlling bars of the gear, Fig. 4 a diagram of the combinations of lifting-wires of a Jacquard loom belonging to each unit, which wires operate at various moments to put the corresponding differential gears into operation.

Figs. 5 and 6 illustrate another constructional form of gear according to the invention, Fig. 5 being a longitudinal section and Fig. 6 a transverse.

Figs. 7 to 10 face views of the sun wheels with recessed positioning disks.

Figs. 11 and 12 are longitudinal and transverse section respectively of another modification having sun wheels with recessed disks as shown in Figs. 13 to 16.

Fig. 17 illustrates an application of the novel gear to the work frame of an embroidering machine.

Although the novel differential gear may be applied to machine tools, machines of precision, machines in which a variety of different motions have to be produced or controlled, and to calculating machines and the like, and if necessary a number of these differential gears can be made to operate in series so that the final shaft of the one gear forms the first or primary shaft of the next, the invention is shown in Fig. 17 as applied to the work frame of an embroidering machine. In this figure 32 is the shaft to which the total of the contributory movements of the various differential gears is imparted and this shaft 32 acts directly and through bevel wheels on screw spindles which shift the work frame (shown fragmentarily) of an embroidering machine.

Referring to Figs. 1 and 3 racks 31 or any suitable means are employed for imparting rotary motion to the gear through the medium of a wheel 30 which is turned clockwise or counterclockwise in accordance with the pattern to be produced. This rotary motion is imparted to the driving shaft 33 of the gear which is journalled at both sides in bearings 29. The driving wheels 22, 23, 24 to 28 mounted side by side on the shaft 33 are splined on the latter which is provided with feather keys 34. The said driving wheels are provided with protruding hubs adapted to be engaged by collars 35 by means of which the driving wheels can be shifted longitudinally on the shaft 33 so as to be brought into and out of mesh with the differential gears. The coupling and uncoupling of the driving wheels is brought about by shifting members 36, 37, 38 to 42 in accordance with the pattern to be produced by means of the jacquard apparatus. The shifting members 36 to 42 are mounted in bars arranged so as to form a grating and to slide to and fro in grooves or recesses formed in supports 43. Each of the driving wheels 22 to 27 transmits its measured motion, which is the same in the case of each wheel, to the toothed wheels 8 to 14 which impart motion to the differential gears. All coupled wheels rotate in the same direction. The toothed wheels 9, 10, 11 to 14 are provided with lateral pins 44 on which planet wheels 15—16, 16—17, 17—18, ... 20—21 are revolubly mounted. By the rolling of these wheels upon the sun wheels 1—2, 2—3, 3—4, ... 6—7 the fundamental motions which are transferred from the driving shaft 33 to the differential gears are differentiated and transformed in accordance with the pattern to be produced and they are ultimately transferred to the work frame driving spindle or shaft 32 mounted in the main bearings 45. The toothed wheel 8 is rigidly fixed to the first sun wheel 1.

The operation of the gear is as follows: Assuming that the first differential gear only is thrown on by means of the shifting member 36 which throws the driving wheel 22 into gear, and that all the other driving wheels are out of gear and that their associated differential gears are arrested by the arresting wedges 46, the fundamental motion imparted to the shaft 33 by the rack 31 will be transferred by the coupled wheel 22 to the toothed wheel 8 with which it is in mesh and to the sun wheel 1 fixed to the wheel 8. As all the other toothed wheels 9, 10, 11, ... 14 are arrested the pairs of planet wheels 15—16, 16—17, 17—18 ... 20—21 will also be locked so that the said first fundamental motion will not be differentiated at the first sun wheel 1, but will only be transformed, and it will be converted through all of the locked gears progressively into the different degrees or magnitudes of motion of the geometrical series up to the last sun wheel 7, where the desired motion to be imparted to the work frame driving spindle results. Since fundamental motions of equal magnitude are transferred to the successive gears and are divided by the stepped sun wheels into contributory motions the same magnitude or degree of motion of the geometrical series can also be obtained by stepped planet wheels, it only being necessary to make the ratio of transmission of the sun wheel to the planet wheel or vice versa correspond to the particular magnitude of motion of the geometrical series. But as soon as the one or the other of the driving wheels 22, 23, 24 ... 28 is thrown into gear in accordance with the pattern to be produced the differential speeds of the coupled differential gear are added in the same sense of rotation to the magnitudes of motion which are already being progressively transformed and these different speeds are in turn converted by the planet wheels that are stationary into other magnitudes of motion of the geometrical series and ultimately transferred through the last sun wheel to the work frame driving spindle to produce the desired displacement of the work frame. The toothed wheels 8, 9, 10 ... 14 which, according to the pattern to be produced, may not be in mesh with a driving wheel, have to be arrested so as to prevent any incidental motion of the same. This retaining of these wheels is effected by the locking wedges 46 formed in a shape of projections on the shifting members 35. When the driving wheels 22—28 are thrown out of gear these locking wedges 46 enter into engagement with the teeth of the spur wheels 8—14. When the driving wheels are thrown into mesh the locking wedges leave the toothed wheels automatically.

In the new motion changing device no securing means is provided for the driving wheel shifting members, because it is of no consequence whether all of the shifting members are in engaging positions at the same time or whether only some of them are in this position. This circumstance is a great advantage in comparison with existing automatic embroidering machines because false holes in the cards, which result in wrong shifting members being put in the operation, require a cumbersome securing device or guard in the form of a kind of lock. But this guard often fails to act and hence ruptures are unavoidable. On the other hand the accuracy obtained by this new device is much greater than that obtained by means of known automatic gear controllers, because the pitches of the teeth of the various differential gears are made to become finer and finer throughout the entire speed changing device so that any lost motion in the various differential gear becomes smaller and smaller towards the final individual gear. The steps in the contributory motions will, when diagrammatically represented in accordance with a system of coordinates, not form a straight line, but a curve in the shape of a parabola as indicated by the dotted line in Fig. 4 which passes through the end points of the ovals and circles representing the various steps. The differentiation is greatest at the vertex of the parabola. Hence with the aid of this new device it is even possible to obtain stitches that can hardly be seen with the naked eye such as are necessary in very fine embroidery, provided that the work frame driving spindles operate with the necessary degree of accuracy.

Another advantage over known devices which are not operated by differential gears working in series, but by motion transforming levers, consists in the fact that for both directions of motion (horizontal and vertical) of the work frame driving spindle only seven gear wheel shifting members are required for each direction for 127 units, 8 gear shifting members being sufficient for 256—1 units and 9 shifting members for 512—1 units and so on, so that the total number of gear shifting members required is 14 (2×7) 16, 18 and so on respectively, which do the whole of the work, as against 40 gear wheel shifting members in the known automatic embroidering machines provided with motion transforming levers and arranged for only 100 units. Consequently the breadth of the jacquard card for the new automatic embroidering machine is reduced to $\frac{1}{3}$ of the ordinary width card which, in view of the large amount of jacquard cards required, is of considerable importance. In addition to this the construction of the card perforating machine for the new automatic embroidering machine is considerably simplified.

The modified device shown in Figs. 5 and 6 operates on the same lines as that shown in Fig. 1. In this device, however, 2 groups of differential wheels corresponding to 9, 10, 11 and 9', 10', 11' are mounted upon the work frame driving spindle 32. Associated with each of the sun wheels 1, 2, 3, 4 and 1', 2', 3', 4' is a disk 19, 20, 21, 22 and 19', 20', 21', 22' respectively, each disk being rigidly fixed to the sun wheel and having a number of recesses in its periphery that corresponds to the magnitude of its contributory motion. The peripheral recesses are shown in Figs. 7–10 which represent the disks 19', 20', 21', 22'.

Whenever the work frame has been shifted the gear has to be locked against further motion for a certain interval of time and this can be accomplished with the aid of the recessed disks in a very simple manner and yet with great certainty and accuracy by means of the recessed disks. The locking action is carried out by means of a setting bar 47 arranged parallel to the shaft 32 and guided by guide members 48. The setting bar is shifted vertically by means of a cam or an eccentric not shown in the drawing. Mounted on the setting bar are a number of locking teeth 49, 50, 51, 52 and 49', 50', 51', 52' respectively which engage with the grooves or recesses 53, 54, 55, 56 and 53', 54', 55' 56' respectively as soon as the gear is thrown on.

The magnitude of motion or total amount of rotation produced by the first group of differential wheels is imparted to the shaft 32 by means of the key 46 by which the last sun wheel 4 and recessed disk 22 is fixed to the shaft 32, while the motion produced by the second group of gear wheels is imparted to the revoluble wheel housing 57 and differentiated by the planet wheels 58, 59 and the spur wheel 60 from the total motion produced by the first group of wheels, the result of the 2 differentiated total motions being imparted through the toothed wheels 61 to the shaft 62. The ratio of transmission of the 2 differentiated groups of wheels is determined by the ratio of transmission of the wheels 60 and 61.

As soon as the gear reaches the reversing position the bar 47 is moved radially upwards and then the locking teeth 49 and 49' will be the first to enter their recesses 53 and 53' respectively so as to arrest the first sun wheel 1 and 1' respectively. Since the sun wheel 1 (Fig. 5) is fixed to the toothed wheel 8, and is thus in direct engagement with the driving wheel 22 or its associated locking toothed members 46, only the play of the teeth of the toothed wheel 8 has to be taken into account for the first sun wheel. Since this play by itself is very small the tooth 49 will enter into the recess 53 with a considerable degree of accuracy and will positively lock the sun wheel 1.

The locking of the next differential gear takes place in exactly the same manner. The play which gives rise to lost motion occurs only between the planet and sun wheel. Since the play in the first differential gear is already disposed of by locking the recessed disk 19 the play that remains in the second gear will only be very small and the locking tooth 50' will be sure to enter into proper engagement with its recessed disk and to set its associated sun wheel into the proper position.

By locking the sun wheels in succession in this manner the play between the flanks of the teeth will be prevented in each gear individually at certain moments so that the plays in the various gears will be prevented from being progressively cumulative. By this means the proper engagement of the last arresting or setting teeth 52, 52' is secured.

In the modification shown in Fig. 11 the locking of the various gears is not accomplished by a vertical movement of an arresting or setting rod or bar 47, but by shifting a stop carrier horizontally which is arranged to slide upon a dovetail guide member 48, Fig. 12. The individual stopping members or detents 49, 50, 51, 52 are therefore arranged accordingly upon the stop carrier or bar 47. The arrangement of the individual detents is such that the locking of the recessed disks 18', 20', 21', 22' occurs in steps, i. e. the disks are locked one after the other. To enable this to be done the recessed disks are of different thicknesses and the arrangement is such that when the parts are in their normal positions the gap between the recessed disk 19' and its associated detent pin 49 is smallest, while the gap between the recessed disk of the last differential gear and its associated detent pin is greatest. The detent pins 49, 50, 51, 52 are ground so as to fit accurately in the detent holes 53, 54, 55, 56 and to prevent all play, whereby the displacement of the work frame is caused to take place with the highest possible degree of accuracy.

I claim:—

1. A motion changing gear comprising a common driven shaft, a plurality of differential gears mounted on the said common shaft; each said differential gear comprising a differential wheel, a planet wheel mounted upon the said differential wheel and sun wheels at either side of the differential wheel; a driving wheel associated with each differential wheel; each said planet wheel being in engagement with sun wheels associated with adjacent differential wheels; and means for throwing any number of said driving wheels into gear with their respective differential wheels, whereby the motion of the said driving wheels may be transmitted to the said common driven shaft through one or more of said differential gears in accordance with a geometrical series, and means for locking the sun wheels successively against rotation in the order of their arrangement on their shaft.

2. A motion changing gear comprising a common driven shaft; a plurality of differential gears mounted on the said common shaft; each said differential gear comprising a differential wheel, a planet wheel mounted upon the said differential wheel and sun wheels at either side of the differential wheel; a driving wheel associated with each differential wheel; each said planet wheel being in engagement with sun wheels associated with adjacent differential wheels; means for throwing any number of said driving wheels into gear with their respective differential wheels, whereby the motion of the said driving wheels may be transmitted to the said common driven shaft through one or more of said differential gears in accordance with a geometrical series, means for locking the sun wheels successively against rotation in the order of their arrangement on their shaft, said last mentioned means including cooperating elements arranged in pairs, one pair of each of said elements revolving with the shaft, the remaining elements of each pair being arranged for simultaneous lateral movement and positioned at graduated distances from the revolving elements whereby to successively engage said revolving elements.

3. A motion changing gear for embroidering machines comprising a common driven shaft; a plurality of differential gears mounted on the said common shaft; pairs of sun wheels of equal size in the said differential gears; motion arresting disks provided with lateral holes at their peripheries, one disk being located between each pair of sun wheels of equal size, and the number of the said lateral holes corresponding to the contributory motion of a said differential gear; a horizontally displaceable detent carrying bar and horizontal detent pins mounted on the said bar and adapted to engage with the said holes; the pins being of different lengths and the said disks being of different thicknesses, whereby the pins are caused to engage with their respective holes one after the other.

4. In a motion changing gear for embroidering machines; a common shaft; groups of differential wheels arranged on the common shaft; a sun wheel associated with each said differential wheel, the sun wheel of the last differential wheel of the first group being keyed to the said common shaft; a sun wheel fixed on the end of the said common shaft; a sun wheel associated with the last differential wheel of the second group; a rotating gear box connected to the last named sun wheel; a sun wheel fixed to an embroidering machine driving shaft; the sun wheel fixed to the embroidering machine shaft and the said sun wheel fixed to the end of the said common shaft being located in the rotating gear box; and planet wheels in mesh with the sun wheels in the gear box and adapted to add together the amounts of motion produced by the said groups of differential wheels and to impart the resultant motion to the said embroidering machine.

5. In combination with the driving shaft of an embroidering machine a motion changing gear; groups of differential wheels adapted to totalize their contributory motions and to impart the totalized motion to the driving shaft; a driven shaft common to one said group of the differential gears; and a rotary differential gear casing driven by the last group of differential gears and containing a sun wheel on the said driving shaft, a second sun wheel attached to the said common shaft, and planet wheels in mesh with the sun wheels, the ratio of transformation of the said sun wheels determining the ratio of motion transformation between the said groups of differential gears.

In witness whereof I hereunto set my hand in the presence of two witnesses.

FRANZ GAHLERT, JUNIOR.

Witnesses:
GUSTAV WOLICKY,
OTTO SEIBLAU.